Figures 1, 2, 3, 4, 5:
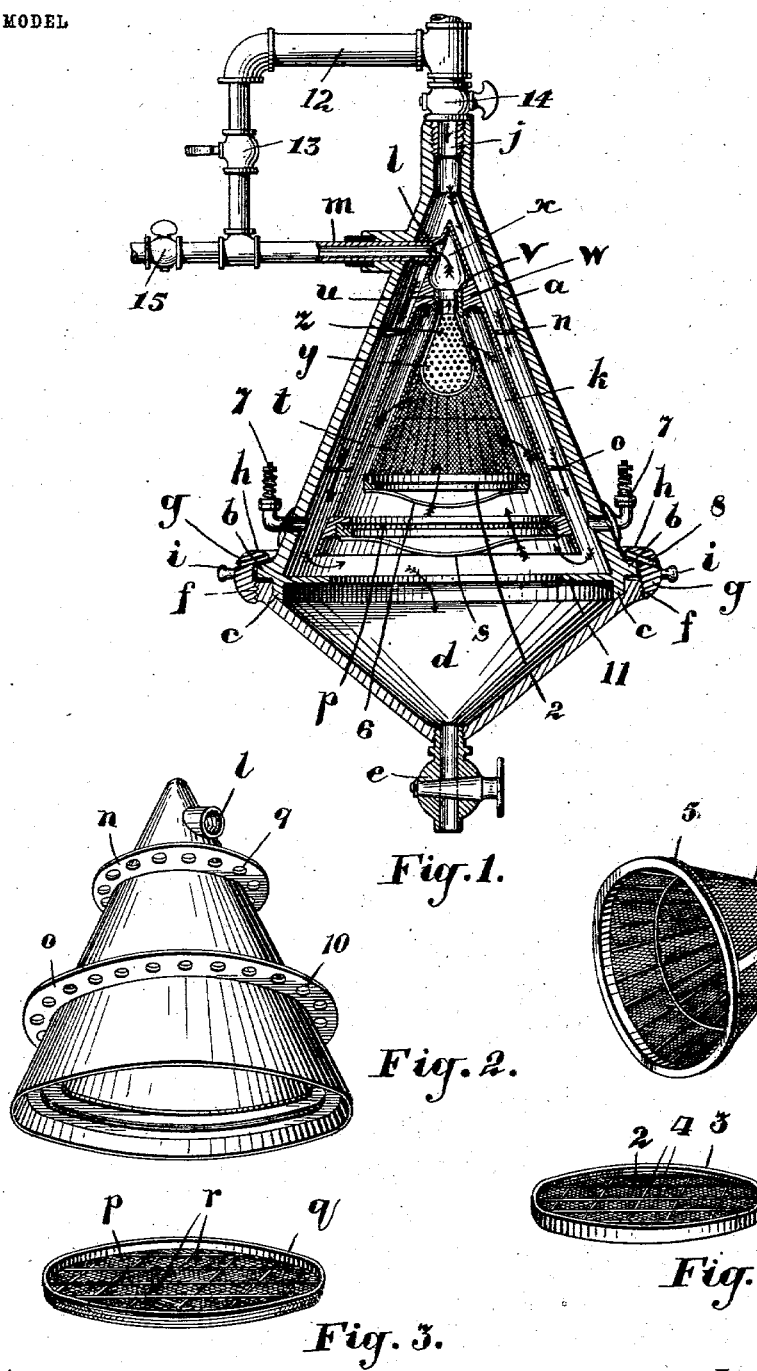

No. 730,356. PATENTED JUNE 9, 1903.
V. A. EMOND.
FILTER.
APPLICATION FILED AUG. 2, 1902.
NO MODEL.

Witnesses.
Lloyd Blackmore
Robert Trotter

Inventor.
V. A. Emond.
by Featherstonhaugh & Co.
Atty.

No. 730,356. Patented June 9, 1903.

UNITED STATES PATENT OFFICE.

VITAL ALFRED EMOND, OF QUEBEC, CANADA, ASSIGNOR TO OCTAVE VALIDA ALFRED EMOND, OF QUEBEC, CANADA.

FILTER.

SPECIFICATION forming part of Letters Patent No. 730,356, dated June 9, 1903.

Application filed August 2, 1902. Serial No. 118,076. (No model.)

*To all whom it may concern:*

Be it known that I, VITAL ALFRED EMOND, a subject of the King of Great Britain, residing at Quebec, in the county of Quebec, Province of Quebec, Canada, have invented certain new and useful Improvements in Filters, of which the following is a specification.

My invention relates to improvements in filters, and the object of the invention is to devise a filter in which the water-pressure will not be materially affected and yet provide sufficient obstruction in the passage of the water to remove all foreign matter therein contained and whereby the flushing of the filter vessel will be rendered easy, facile, and thorough; and it consists, essentially, of cone-shaped outer and inner casings and a basin or sink suitably secured to the outer casing at its lower end, a flushing-valve and relief-valves, a plurality of sieves and screens, and a spraying-nozzle designed to flush an inner screen, the various parts being constructed in detail as hereinafter more particularly described.

Figure 1 is a sectional view of my device. Fig. 2 is a perspective view of the cone-shaped inner casing. Fig. 3 is a perspective view of the screen or sieve-cover for the bottom opening into the inner casing. Fig. 4 is a perspective view of the cone-screen. Fig. 5 is a perspective view of the screen or sieve-cover for the bottom of the cone-screen.

Like characters of reference indicate corresponding parts in each figure.

$a$ is the outer casing, and $b$ and $c$ flanges projecting outwardly and downwardly from its lower end.

$d$ is the basin or sink, preferably of the inverted-cone-shaped type, having the valve $e$ located at the apex of the cone. The sink $d$ is threaded at its upper and outer edge $f$.

$g$ is a ring inwardly threaded and provided with the overhang or flange $h$ and the teats $i$.

$j$ is an inlet-pipe suitably connected from the water-main to the upper end of the filter.

$k$ is the inner casing, designed to fit inside the outer casing $a$ and leave a space therebetween.

$l$ is a threaded orifice leading from the top of the cone-shaped inner casing $k$ and receiving the outlet or water-supply pipe $m$.

$n$ and $o$ are projecting rings around the outer periphery of the inner casing $k$ and designed to abut the inner periphery of the outer casing $a$ in order that the inner casing may not be affected in its position by vibration, and thereby cause too great a strain on the water-supply pipe $m$, which supports it in its position inside the outer casing. The rings $n$ and $o$ each have a plurality of perforations 9 and 10 to allow the water to pass therethrough and receive its first screening.

$p$ is a screen suitably attached in the rim $q$ and strengthened by the cross-bars $r$. The rim $q$ is threaded and is designed to screw into the lower end of the inner casing $k$, which is correspondingly threaded to receive it.

$s$ is a handle designed to facilitate the screwing and unscrewing of the rim $q$, carrying the screen $p$.

$t$ is a cone-screen having a threaded upper end $u$, designed to screw into a correspondingly-threaded orifice $v$ in proximity to the top end of the inner casing $k$. The threaded orifice leads through the obstructing-wall $w$, which partitions the chamber $x$ at the upper end of the inner casing $k$. It will thus be seen that the only opening up into the chamber $x$ is through the orifice $v$, leading from the interior of the cone-screen $t$.

$y$ is a nozzle having an externally-threaded neck designed to screw into the correspondingly internally threaded opening in the upper end of the cone-screen $t$. The perforations $z$ are distributed in the nozzle $y$ so as to have much fewer at its lower end, and consequently the distance between much greater, than through the sides and upper end, in order that a back rush of water from the pipe $m$ may be thereby induced to spray from all sides of the nozzle rather than be forced direct through the bottom end. This will insure the cleansing of the cone-screen thoroughly on all sides.

2 is a screen or sieve suitably attached to the rim 3 and further braced and strengthened by the cross-bars 4. The rim 3 has its inner periphery threaded and is designed to screw over the rim 5 of the cone $t$.

6 is a handle to facilitate the attaching and removal of the rim 3, and consequently the screen 2 onto the lower end of the cone $t$.

7 represents relief-valves diametrically opposite one to the other and designed to relieve the filter when under the strain of an extra heavy pressure of water from the main.

8 represents orifices bored at one or more points through the flange $h$ in order to provide passages for the sweat of the metal.

11 is a projecting circular ring or plate at the lower end of the outer cone-casing, firmly secured thereto or forming part thereof.

12 is a pipe forming a by-pass between the inlet $j$ and the outlet-pipe $m$.

13 is a cock designed to cut out the by-pass and direct the water through the filter.

14 is a cock designed to cut off the filter from the water-supply.

15 is a cock in the outlet-pipe $m$ and is designed to direct the water passing through the inlet-pipe $j$ and the by-pass 12 into the interior of the cone-screens for the purpose of flushing.

Having explained the various parts involved in my invention in detail, I shall now more particularly explain the operation thereof. The water entering the filter from the water-main through the inlet-pipe $j$, at the top of the outside cone-casing, flows down between the outer periphery of the inner casing and the inner periphery of the outer casing and through the perforations 9 and 10 in the rings $n$ and $o$. The rings $n$ and $o$, though designed to steady the position of the inner casing, act also in the capacities of the first and second screen for the water, preventing any large particles of foreign matter to pass therethrough. The water continues in its course after having passed the obstructing-rings and is turned in its flow at the bottom of the outer casing by the projecting ring or plate 11. The basin or sink $d$ will now fill up and as the pressure of water continues down between the casings and into the sink it will rise up in the center through the screen $p$, covering the open bottom of the inner casing, thus eliminating more of the foreign matter. The water still continues to rise up inside the inner casing $k$ and fills up the cone-screen $t$, entering through the sides and the bottom screen 2. The obstructing-wall $w$ absolutely prevents any water rising to the chamber $x$ except through the nozzle $y$ and the passage $v$. The continuous pressure of water keeps the filter constantly full and on drawing water from the supply-pipe the circulation through the filter is complete, for the water continues to pass, in the order named, receiving at every stage a still finer screening. A sudden shock from an increased pressure of water from the main is relieved by the valves 7, which are made after any suitable pattern, though shown in the drawings as a simple spiral-spring valve, the said springs having a definite compression regulated to the pressure.

The flushing of my filter is an extremely important matter and is essential to the operation thereof. For instance, to insure the cleansing of the screens and the general flushing of the inside of the inner casing the water is turned back through the supply-pipe $m$ by suitable connections thereto with the main. The water-supply from the main entering at the top of the outer casing is cut off and the back-flow through the supply-pipe allowed, uninterrupted, to flow into the filter through the chamber $x$ and nozzle $y$, which has perforations arranged to direct water all over and through the cone-screen $t$ and at the same time cleansing the inside of the inner casing $k$. The valve $e$ at the lower end of the basin or sink is opened to allow the free passage of the water to the sewer, carrying with it all the dregs and grounds and generally the foreign matter which has been deposited in the bottom of the sink on the outside of the cone $t$.

The filter is especially adaptable for being set in an ice-box having suitable connections with the main and feed-supply pipes through the said box. This will insure the provision of iced and filtered water in any part of a building.

In order to take apart my filter, I attach any suitable form of key onto the teats $i$, and by turning the ring $g$ and unscrewing the same it is thus possible to remove the sink to make repairs, if necessary, to the other parts of my device.

This filter may be made of any suitable metal either in castings or metal plates, the system of screens and flushing arrangements being the salient features.

It must be noted that the connections to the main and to the water-supply pipe are especially arranged so that in case of necessity it will be possible to cut out the filter in the passage, allowing the water to flow independently from the main to the supply-pipe.

What I claim as my invention is—

1. In a filter, the combination with an outer casing preferably cone-shaped and a sink or basin surmounted thereby, of a cone-shaped inner casing suspended therein, a screen or sieve covering for the lower end of the inner casing, a partitioned chamber located at its upper end, a cone screen or sieve suspended from an orifice in the wall of the aforesaid chamber, and a nozzle having a plurality of perforations therethrough, and suspended from the aforesaid orifice into the interior of the screen or sieve, suitable inlets and outlets and a flushing-valve at the bottom of the sink, as and for the purpose specified.

2. In a device of the class described, in combination an outer casing preferably cone-shaped, a sink or basin removably attached to its lower end, a cone-shaped inner casing having one or more projecting rings therearound, suitably perforated, and a screen or sieve covering for its lower end, a partitioned wall in the interior and upper end of the said inner casing having a central threaded orifice therethrough and designed to partition off an upper chamber, a cone screen or sieve having a screen or sieve covering for its lower end and having a threaded upper end designed to be inserted in the aforesaid central orifice, a spraying-nozzle suspended in the interior of the cone screen or sieve, from an orifice at the top, and suitable inlets and outlets, as and for the purpose specified.

3. In a device of the class described, a series of cones comprising an outer casing suitably attached to and supported by a sink or basin, an inner casing having a perforated or screen base and an upper chamber therein, one or more encircling rings projecting from its outer periphery with perforations therethrough, a cone screen or sieve of finer mesh than the base of the inner casing, and suspended from a central orifice in the partitioned wall of the aforesaid upper chamber in the interior of the inner casing, suitable inlets and outlets and means for flushing and cleansing the screens or sieves, as and for the purpose specified.

4. In a filter, the combination with an outer cone-shaped casing and a sink or basin surmounted thereby and connected to the main water-supply, a cone-shaped inner casing with a screen or sieve base and having a threaded orifice at its upper end designed to receive outlet or water-supply pipe, a cone-shaped screen or sieve closed at the lower end by a sieve-covering and supported in the interior of the inner casing, a spraying-nozzle supported in the interior of the said cone-screen and having its perforations arranged to spray heavier from the sides thereof, and an internally-threaded ring or band designed to hold the sink securely in its position on the outer cone-shaped casing, and a suitable outlet-valve at the bottom of the said sink, as and for the purpose specified.

Signed at Montreal, in the district of Montreal, in the Province of Quebec, Canada, this 19th day of June, 1902.

VITAL ALFRED EMOND.

Witnesses:
LLOYD BLACKMORE,
ROBERT TROTTER.